June 23, 1925.
L. D. NELSON
AUTOMOBILE HEATER
Filed Jan. 16, 1922
1,543,339
2 Sheets-Sheet 1
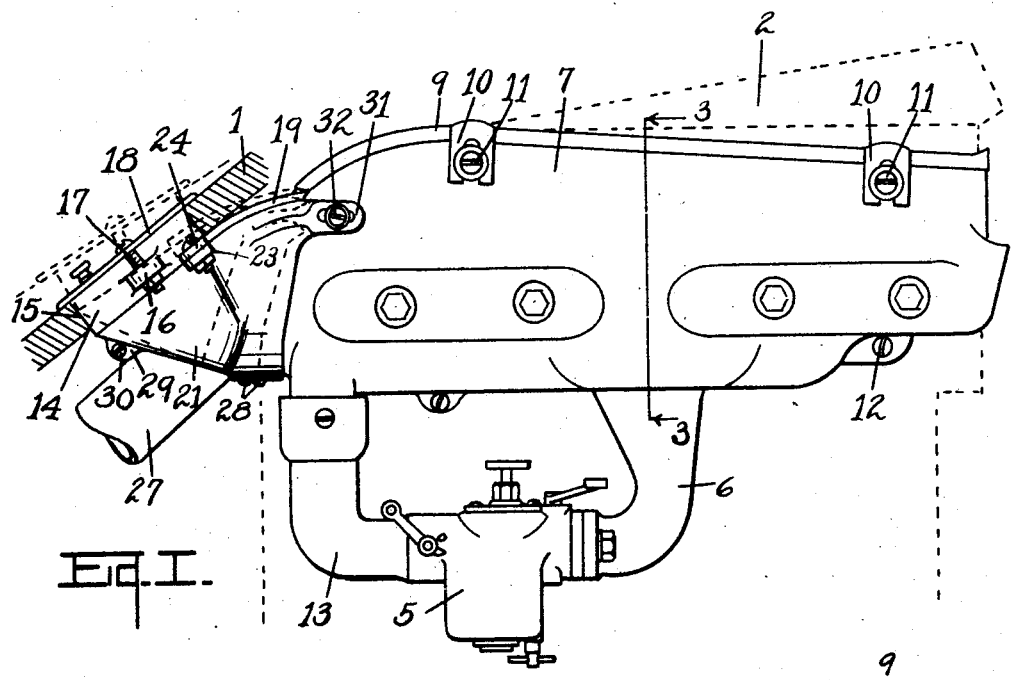
Fig. I.
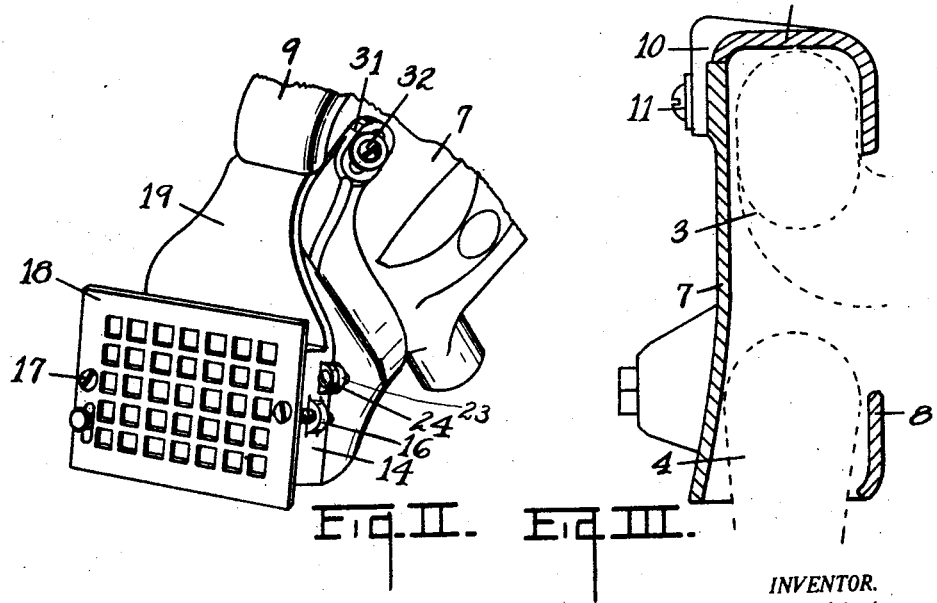
Fig. II.   Fig. III.
INVENTOR.
Lewis D. Nelson
BY Chappell Earl
ATTORNEYS

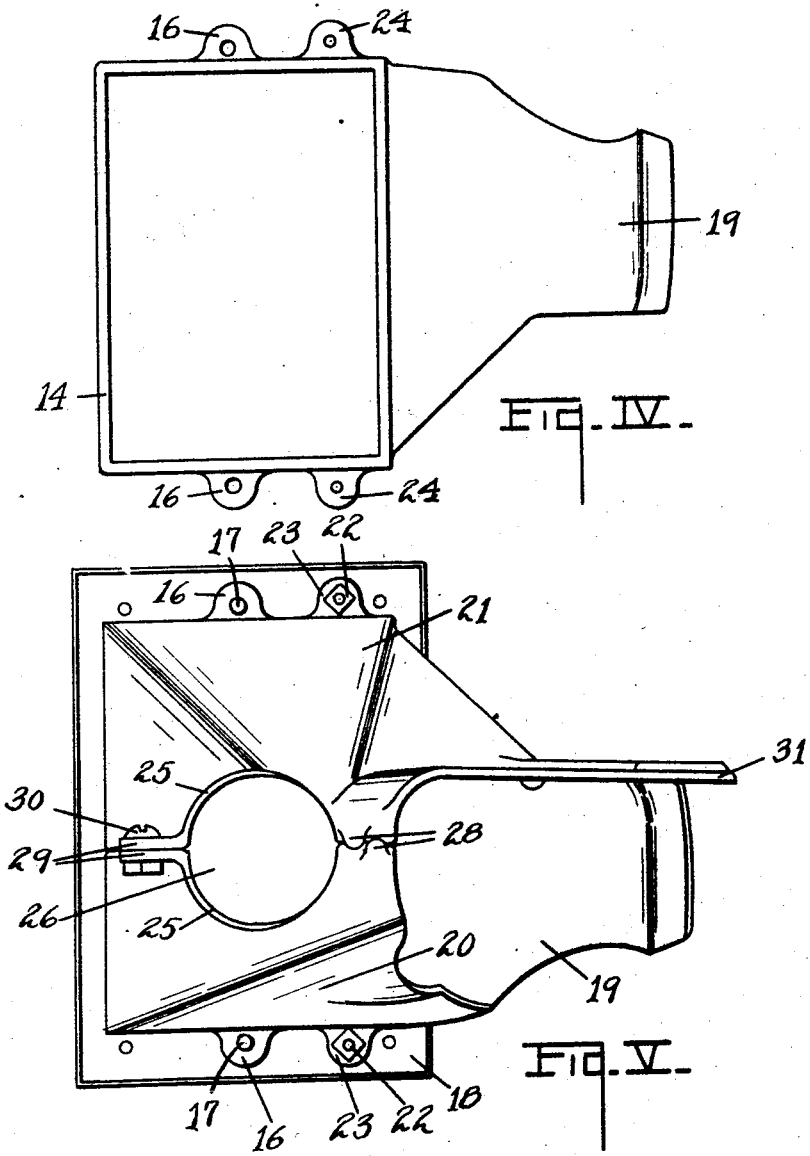

Patented June 23, 1925.

1,543,339

UNITED STATES PATENT OFFICE.

LEWIS D. NELSON, OF COLDWATER, MICHIGAN.

AUTOMOBILE HEATER.

Application filed January 16, 1922. Serial No. 529,489.

*To all whom it may concern:*

Be it known that I, LEWIS D. NELSON, a citizen of the United States, residing at Coldwater, county of Branch, State of Michigan, have invented certain new and useful Improvements in Automobile Heaters, of which the following is a specification.

This invention relates to improvements in automobile heaters.

The main objects of the invention are:

First, to provide an improved automobile heater which may be utilized in connection with a heater for the inlet manifold and for heating air for the carbureter.

Second, to provide a structure having these advantages which may be easily and quickly applied to motor vehicles such as Ford automobiles without disassembling any of the parts thereof.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a detail side elevation of a structure embodying the features of my invention, an engine being indicated by dotted lines and only the floor board of the vehicle being shown in order to illustrate the relation of my improved heater thereto.

Fig. II is a detail perspective view of my improved heater.

Fig. III is a vertical section through the manifold housing on a line corresponding to line 3—3 of Fig. I.

Fig. IV is a plan view of the register box and of the conduit top wall which is formed integrally therewith.

Fig. V is an inverted view of the register box and conduit.

In the drawing similar reference characters refer to similar parts throughout the several views.

Referring to the drawing, 1 represents the footboard of a motor vehicle, such as a Ford automobile, and 2 the engine, 3 the exhaust manifold and 4 the intake manifold. The engine and the manifolds are indicated conventionally by dotted lines.

The carbureter is connected to the intake 6 of the intake manifold. I provide a housing comprising a front section 7, rear section 8 and top section 9. The top section is adjustably supported to the front section by means of the lugs 10 and bolts 11. The rear section is secured to the front section by means of the bolts 12. A pipe 13 connects the housing to the air intake of the carbureter. These parts are substantially those shown in my Patent No. 1,366,018, dated Jan. 18, 1921, and are, therefore, not illustrated or described with further detail herein.

My improved heater comprises a register box 14 adapted to be seated in an opening 15 in the footboard of an automobile. This register box is provided with a pair of lugs 16, one at each end, which are adapted to receive the attaching bolts 17 for the register face 18. The register box has a conduit top wall 19 formed integrally therewith. The conduit members 20 and 21 are secured to the register box by the bolts 22 which are disposed through ears 23 on the conduit members and aligned ears 24 on the register box.

The conduit members are provided with registering recesses 25 which form an opening 26 for the exhaust pipe 27. The members 20 and 21 have interlapping lugs 28 at one side of the opening and ears 29 at the other side which are secured together by the bolt 30.

With the parts thus formed and arranged the register box and conduit may be assembled without disassembling the parts of the automobile, it being possible to mount the manifold housing without removing the manifold. The forward end of the register box conduit telescopes with the rear end of the housing as is illustrated and is adjustably secured thereto by means of the slotted arm 31 on one of the conduit side members which is engaged with the bolt 32 on the housing. This allows for adjustment to accommodate variations in the angle of the footboard which is indicated by dotted lines in Fig. I, such variations not being unusual.

My improved heater is economical in construction, is efficient, and is easily and quickly assembled.

Having thus described my invention, what I claim as new and desire to secure by Letters Patent, is:

1. In a structure of the class described, the combination of a housing for the exhaust manifold of an internal combustion engine, a register box adapted to be inserted in the foot board of a motor vehicle, a conduit secured to said register box and having an opening in the bottom thereof through which the exhaust pipe of an exhaust manifold may be disposed, said conduit being disposed in telescoping relation with the rear end of said housing and having a forwardly projecting slotted arm adjacent the upper side thereof, and a bolt on said housing engaging said slot.

2. In a structure of the class described, the combination of a housing for the exhaust manifold of an internal combustion engine, a register box adapted to be inserted in the foot board of a motor vehicle, and a conduit secured to said register box and having an opening in the bottom thereof through which the exhaust pipe of an exhaust manifold may be disposed, said conduit being disposed in pivotal and telescoping relation with the rear end of said housing permitting longitudinal and tilting adjustment of said conduit.

3. In a structure of the class described, the combination of a housing for the exhaust manifold of an internal combustion engine, a register box adapted to be inserted in the foot board of a motor vehicle, a conduit secured to said register box and disposed in pivoted and telescoping relation with the rear end of said housing and having a forwardly projecting slotted arm adjacent the upper side thereof, and a bolt on said housing engaging said slot whereby said conduit is supported for tilting and longitudinal adjustment.

4. In a structure of the class described, the combination of a housing for the exhaust manifold of an internal combustion engine, a register box adapted to be inserted in the foot board of a motor vehicle, and a conduit secured to said register box and disposed in pivotal and telescoping relation with the rear end of said housing permitting longitudinal and tilting adjustment of said conduit.

5. In a structure of the class described, the combination of a housing for the exhaust manifold of an internal combustion engine, a register box adapted to be inserted in the foot board of a motor vehicle, a conduit secured to said register box and having an opening in the bottom thereof through which the exhaust pipe of an exhaust manifold may be disposed, said conduit being adjustably associated with said housing and having a slotted part engaged by a bolt on said housing.

6. In a structure of the class described, the combination of a housing for the exhaust manifold of an internal combustion engine, a register box adapted to be inserted in the foot board of a motor vehicle, and a conduit secured to said register box and adjustably associated with said housing and having a slotted part, a bolt on said housing engaging said slotted part whereby said conduit is supported for tilting and longitudinal adjustment relative to said housing.

7. In a structure of the class described, the combination of a housing for the manifold of an internal combustion engine, a register box provided with lugs at each end thereof and with an integral conduit top wall, a register face, attaching bolts therefor engaged with ears at the ends of said register box, a pair of conduit members having registering recesses in the bottom edges thereof adapted to form an exhaust pipe opening, said sections having interlocking lugs at one side of said recesses and ears at the other side adapted to receive a coupling bolt, said members being provided with lugs at their upper edges aligned with lugs on said register box and secured thereto by bolts, one of said conduit members being provided with a slotted projection, and a bolt on said housing engaging said slot.

8. In a structure of the class described, the combination of a housing for the manifold of an internal combustion engine, a register box provided with lugs at each end thereof and with an integral conduit top wall, a register face, attaching bolts therefor engaged with ears at the ends of said register box, a pair of conduit members having registering recesses in the bottom edges thereof adapted to form an exhaust pipe opening, said sections having interlocking lugs at one side of said recesses and ears at the other side adapted to receive a coupling bolt, said members being provided with lugs at their upper edges aligned with lugs on said register box and secured thereto by bolts.

In witness whereof, I have hereunto set my hand and seal.

LEWIS D. NELSON. [L. S.]